US011906110B2

(12) United States Patent
Zrim et al.

(10) Patent No.: US 11,906,110 B2
(45) Date of Patent: Feb. 20, 2024

(54) TANK CONTAINER FOR TRANSPORT AND STORAGE OF CRYOGENIC LIQUEFIED GASES

(71) Applicant: Aspen Aerogels, Inc., Northborough, MA (US)

(72) Inventors: Milan Zrim, Ljubljana (SI); Mihael Gruden, Ljubljana (SI)

(73) Assignee: Aspen Aerogels, Inc., Northborough, MA (US)

( * ) Notice: Subject to any disclaimer, the term of this patent is extended or adjusted under 35 U.S.C. 154(b) by 459 days.

(21) Appl. No.: 16/945,903

(22) Filed: Aug. 2, 2020

(65) Prior Publication Data

US 2020/0363013 A1 Nov. 19, 2020

Related U.S. Application Data

(63) Continuation of application No. 14/992,171, filed on Jan. 11, 2016, now Pat. No. 10,731,793, which is a (Continued)

(30) Foreign Application Priority Data

Feb. 10, 2012 (SI) .................................... 201200040

(51) Int. Cl.
*F17C 5/02* (2006.01)
*F17C 3/02* (2006.01)
(Continued)

(52) U.S. Cl.
CPC ................ *F17C 5/02* (2013.01); *F17C 3/022* (2013.01); *F17C 3/04* (2013.01); *F17C 13/001* (2013.01);
(Continued)

(58) Field of Classification Search
CPC .... F17C 5/02; F17C 3/022; F17C 3/04; F17C 13/001; F17C 2201/0109; F17C 2201/032; F17C 2201/035; F17C 2201/054
(Continued)

(56) References Cited

U.S. PATENT DOCUMENTS 3,101,861 A 8/1963 Mearns, III et al.
3,583,352 A * 6/1971 Alleaume ............... F17C 13/08 220/560.12
(Continued)

FOREIGN PATENT DOCUMENTS

DE 4447345 C1 * 5/1996 ........... B23Q 1/0054
DE 10302394 A1 * 12/2004 ............... E04B 1/36
(Continued)

OTHER PUBLICATIONS

U.S. Appl. No. 14/377,629, Final Office Action dated Jul. 6, 2015, 7 pgs.
(Continued)

*Primary Examiner* — J. Gregory Pickett
*Assistant Examiner* — Niki M Eloshway
(74) *Attorney, Agent, or Firm* — Schwegman Lundberg & Woessner, P.A.

(57) ABSTRACT

An insulation arrangement configured to cover a vessel containing a liquified gas is provided. Embodiments include an insulation arrangement including an aerogel composition and a vapor barrier, where the insulation arrangement reduces heat transfer between the ambient environment and the liquified gas. Other embodiments include an insulated clamping device configured to connect a vessel to a framework and a connection system including the insulated clamping device, where the vessel includes the aforementioned insulation arrangement.

20 Claims, 8 Drawing Sheets

Related U.S. Application Data continuation of application No. 14/377,629, filed as application No. PCT/EP2013/052559 on Feb. 8, 2013, now Pat. No. 9,488,313.

(51) Int. Cl.
*F17C 13/00* (2006.01)
*F17C 3/04* (2006.01)

(52) U.S. Cl.
CPC *F17C 2201/0109* (2013.01); *F17C 2201/032* (2013.01); *F17C 2201/035* (2013.01); *F17C 2201/054* (2013.01); *F17C 2203/03* (2013.01); *F17C 2203/0308* (2013.01); *F17C 2203/0325* (2013.01); *F17C 2203/0329* (2013.01); *F17C 2203/0629* (2013.01); *F17C 2203/0643* (2013.01); *F17C 2203/0697* (2013.01); *F17C 2205/013* (2013.01); *F17C 2205/0107* (2013.01); *F17C 2205/0126* (2013.01); *F17C 2205/0192* (2013.01); *F17C 2205/0332* (2013.01); *F17C 2209/221* (2013.01); *F17C 2221/011* (2013.01); *F17C 2221/013* (2013.01); *F17C 2221/014* (2013.01); *F17C 2221/016* (2013.01); *F17C 2221/033* (2013.01); *F17C 2223/0161* (2013.01); *F17C 2223/033* (2013.01); *F17C 2250/043* (2013.01); *F17C 2250/0408* (2013.01); *F17C 2250/0626* (2013.01); *F17C 2260/012* (2013.01); *F17C 2260/013* (2013.01); *F17C 2260/033* (2013.01); *F17C 2270/0102* (2013.01); *F17C 2270/0165* (2013.01); *F17C 2270/0173* (2013.01)

(58) Field of Classification Search
USPC ..................................................... 220/560.13
See application file for complete search history.

(56) References Cited

U.S. PATENT DOCUMENTS 4,038,832 A * 8/1977 Lutgen .................. F17C 13/086 220/592.27
4,065,019 A * 12/1977 Letourneur ............. F17C 3/025 220/560.07
4,354,612 A * 10/1982 Pelabon ............... B65D 88/128 220/1.5
4,481,778 A * 11/1984 Reinker ................ F17C 13/088 220/901
5,464,116 A * 11/1995 Aoki ..................... F17C 13/004 220/586
6,068,882 A * 5/2000 Ryu ...................... C04B 14/302 427/403
9,488,313 B2 11/2016 Zrim et al.
2003/0029877 A1* 2/2003 Mathur ..................... F17C 3/08 220/592.27
2006/0096185 A1* 5/2006 Dhellemmes ........... F17C 3/027 52/168
2007/0007962 A1* 1/2007 Mraz ....................... F17C 13/08 324/318
2007/0228045 A1* 10/2007 Goldbach ............... B63B 25/16 220/481
2008/0087870 A1* 4/2008 Williams ............... C08J 9/0066 521/189
2008/0307798 A1* 12/2008 Luo ......................... F17C 13/02 220/560.12
2010/0146992 A1* 6/2010 Miller ....................... F17C 3/04 62/53.2
2011/0031861 A1* 2/2011 Gentry ................. F25J 3/04945 29/890.035
2012/0009834 A1* 1/2012 Augustyniak ............. B32B 5/16 428/447
2014/0034179 A1* 2/2014 Heyden ................... B32B 37/18 138/140
2014/0166663 A1* 6/2014 Sele .......................... F17C 1/08 220/560.04
2015/0008228 A1 1/2015 Zrim et al.
2018/0320824 A1* 11/2018 Fay ......................... B32B 3/266

FOREIGN PATENT DOCUMENTS

DE 102008052877 A1 * 4/2010 .............. F17C 13/08
PE 1165624 B 3/1964
WO WO-2013117706 A1 8/2013

OTHER PUBLICATIONS

U.S. Appl. No. 14/377,629, Non Final Office Action dated Feb. 19, 2015, 6 pgs.
U.S. Appl. No. 14/377,629, Notice of Allowance dated Oct. 22, 2015, 6 pgs.
U.S. Appl. No. 14/377,629, Preliminary Amendment filed Aug. 8, 2014, 4 pgs.
U.S. Appl. No. 14/377,629, Response filed May 11, 2015 to Non Final Office Action dated Feb. 19, 2015, 15 pgs.
U.S. Appl. No. 14/377,629, Response filed Sep. 4, 2015 to Final Office Action dated Jul. 6, 2015, 8 pgs.
International Application Serial No. PCT/EP2013/052559, International Preliminary Report on Patentability dated Aug. 21, 2014, 8 pgs.
International Application Serial No. PCT/EP2013/052559, International Search Report dated Jun. 25, 2013, 4 pgs.
International Application Serial No. PCT/EP2013/052559, Written Opinion dated Jun. 25, 2013, 6 pgs.

* cited by examiner

TANK CONTAINER FOR TRANSPORT AND STORAGE OF CRYOGENIC LIQUEFIED GASES

CROSS-REFERENCES TO RELATED APPLICATIONS

This application is a continuation of U.S. patent application Ser. No. 14/992,171, filed Jan. 11, 2016; which is a continuation of U.S. patent application Ser. No. 14/377,629, filed Aug. 8, 2014; which is a National Stage Application under 35 U.S.C. § 371 of PCT/EP2013/052559 filed on Feb. 8, 2013; which claims priority to the Slovenian International Patent Application SI201200040 filed on Feb. 10, 2012; all of which are hereby incorporated by reference in their entirety as if fully set forth.

DESCRIPTION

The invention relates to the development of cryogenic equipment for transport and storage of liquefied gases where the family of cryogenic equipment for transport and storage consist of horizontal and vertical vessels and transportable—mobile equipment in ISO containers. The invention specifically relates to a tank container for the transport and storage of cryogenic liquefied gas, comprising a framework and a cylindrical vessel connected to the framework.

KNOWN STATE OF DEVELOPMENT

The current existing technological solutions based on technologies of performance of traditional insulation, which are also applicable in other insulation applications, such as the use of vacuum insulated cryogenic vessels with applications to storage and transport containers and expanded foam, expanded glass, perlite and similar inorganic materials. The traditional insulation of cryogenic tanks is considered to still require a significant low vacuum for successful operation. Insulation based on nanostructure gels has already achieved in atmospheric pressure values of insulation, which are better than in comparable existing materials, but the available potential and properties that are not to be found in conventional materials is exploited in this application.

Cryogenic gases are stored in liquid form at extremely low temperatures. Fields of application are expanding along with increased technological possibilities in the industry and energy supply. Of the liquefied gas used most are liquefied natural gas, liquefied nitrogen, liquefied oxygen, argon and $CO_2$. The temperature of liquefied gas goes down to −196° C. (liquid nitrogen—LIN), oxygen (LOX) and argon (LAR), natural gas (LNG) at −163° C., carbon dioxide ($LCO_2$) is the warmest with temperatures ranging from −40° C. down to −80° C.

The introduction of the liquefied methane industry in the supply system and group of consumers in some countries of the world (Brazil, Indonesia) achieved a remarkable delivery volume. Expansion of gas pipeline network is capital intensive and is difficult in areas with low consumption population density; the supply of liquefied gas provides the introduction of gas in areas where the supply pipeline is possible only after a long period of growth in consumption. Introducing the use of liquefied natural gas in transport would significantly reduce the pressure on the market of liquid fuels. The presence of such equipment solutions on the market facilitates the development of such means of transport and facilitates the issue of pollution from particulates and pollutant gases in urban and densely populated regions, where the work force carry out hundreds of kilometers of journeys per day. The supply of natural gas as an energy provider has taken place so far exclusively through primary, secondary and tertiary networks of gas pipelines. Construction of gas pipelines is capital intensive and requires at least a basic supply of gas to enough powerful customers. This condition is unavailable in many locations in a real short time. Alternative in this regard is the introduction of LNG in smaller tanks, which would provide for such monthly consumption at the specified location (a small industry or residential area) for the supply of liquefied gas would need modified mobile containers for the transport of liquefied gas to the local reservoirs.

For storage and transport of liquefied gases have hitherto been used tanks or tank containers with superinsulation features (thermal conductivity of the insulation material below 0.020 W/mK) realized by a double-vessel design wherein the space between the two vessels is vacuumed. Production of such double container and vacuuming of the dead space is technologically very demanding and expensive. Thus, the container must be serviced annually for vacuuming dead space, which can last several weeks, while all the time necessary for restoring the insulation the tank is useless.

The underlying problem of the present invention is therefore to provide a transport or storage tank, specifically a tank container for cryogenic gases like LNG, LOX, LIN or LAR, which allows for a high transport capacity, a low tare weight, a superinsulation arrangement with low maintenance and a simple structural design suitable for a high temperature difference between the tank vessel and the framework.

SUMMARY OF THE INVENTION

This problem is solved by a tank container according to claim 1. Such a tank container for the transport and storage of cryogenic liquefied gas, comprises a framework and a cylindrical vessel connected to the framework, wherein the vessel is covered by a superinsulation arrangement based on an aerogel composition, and the vessel is connected to the framework by an insulating clamping device which is adapted to allow for a relative movement between the framework and the vessel due to thermal expansion or contraction of the vessel.

Further embodiments of the present invention are indicated in the claims, the following description and the drawings.

ADVANTAGES OF THE INVENTION

The equipment based on the invention differs from the current solutions in the technology of insulation: The insulation is improved, the storage time is prolonged, manufacturing times are shortened, reduced material in quantity and the need for vacuum as the traditional technology of insulation is eliminated.

The introduction of new technologic procedures, new materials and new composites contribute to the solution of technological difficulties, which are not satisfactorily resolved (thermal bridges on supports, losses on functional piping and valves, etc.). In the production significant time is saved due to shorter timing between manufacturing operations. The vacuum insulated vessel requires needs two shells—an outer and an inner shell capable of operation under pressure conditions. The result is double quantity of material and at least double mass of the vessel. The manufacture of two complex vessels takes at least double time (the cryo temperature set due to exquisite complexity range the highest requirements). Also the process of establishing vacuum is slow, and the problem of maintaining vacuum remains. A great portion of time dedicated in the production of vacuum insulated vessels is necessary for the vacuuming process. In addition to this the vacuum through time is lost and regular vacuuming is necessary. The established solutions require repeated vacuuming every 290 to 365 days. The process of vacuuming takes some 250 to 550 hours. The vessel insulated with the solution presented in the innovation can be manufactured in shorter time—a single pressure vessel, lighter—the mechanical protection is one tenth of the vacuum protection, less sensitive to mechanical and fire loads.

The developed procedures allow significant saving in material with the lighter vessel shell, faster installation of the insulation and better control over local deviations, the possibility of insulation of connecting piping all contribute to evaporation rates under 0.38% of full load per day.

The installation of cryogenic vessels in container frames enables multimodal transport within the scope of ADR (road) and RID (rail) and IMDG (sea). Such an implementation can relieve the road transportation and enable access to specific locations.

DESCRIPTION OF THE INVENTION

The cryogenic insulation is suitable for cryo temperatures and also demonstrates in case of flammable gases fire resistance. During the filling the liquefied gas at temperature of gas −186° C. (LIN) to −161° C. (LNG) at ambient pressure. During transport or longer storage the temperature would raise to −135° C., and the pressure in the vessel rises to 6 bars due to heat transfer from the ambient through the insulation. This is the limited pressure where the safety relief valves start to operate or we need to direct the gas to immediate consumption. The insulation is very important for the function of the tank. For the stationary storage tanks the quantity of evaporated gas in a period of time is limited with losses under 0.38% of full load. The evaporation value is determined based on trial operation.

The insulation of vessels with a modern and innovative insulating material based on nanostructure gels based on aerogel material according to the invention avoids the disadvantages of vacuum insulation. High-tech nano-insulation has extremely good insulating properties. Base material formed aerogel, which has in its structure of nano-size pores, which trap molecules of air, which eliminates nearly three modes of heat transfer-convection, -conduction and -radiation and are also flame-retardant. At the same time the material is mechanically stable at temperatures down to −200° C. These properties in the other traditional insulation materials are not common.

The development of vessels with insulation based on nanostructure gels enables the elimination of vacuum. The advantages are directly in the field of the inner and outer vessel shell, both are significantly lighter in weight that means:

The direct material saving for a CRYOTAINER 34000 LNG/40' example is some 10.000 kg. This results in more freight with one shipment. It allows for faster production procedures for material preparation and shorter time for production.

Prefabrication of insulation material with a specialized work group can reduce the insulation time and the overall finalization of products.

The heat transfer from the ambient to the liquefied gas presents a difficulty, a portion of liquefied gas in the vessel is evaporating, and introduction of efficient insulation is essential. The introduction of innovative solutions based on nanostructure insulation materials provides also properties other than insulation alone. These required properties are resistance to low temperatures, fire resistance, light weight, water repellence, vapor permeability and adequate handling qualities.

The new technology allows for significant savings on material and time of production, and in addition offers safety. In case of mechanical damage of the outer shell in nanostructure insulation prevents in contrast to conventional vacuum continuous heat shielding and prevents immediate evaporation in case of vacuum collapse and extends by a multiplier the available time for salvage. In vacuum vessels the damage causes immediate rise of pressure in the vacuum to the level of the atmosphere. With the rising pressure the vacuum loses its insulating properties and very fast evaporation of liquefied gas takes place.

In case of direct fire exposure the new technology of insulation prevents any rise of temperature in the media for at least 120 minutes.

The family of cryogenic vessels for transport and storage of liquefied gases is composed of stationary horizontal vessels of 8600 to 27000 liters. In addition to the horizontal there is a family of vertical vessels with 8600 to 15000 liters. The family of transportable (intermodal) vessels in ISO container frames is two models with 16800 and 32600 liter volume.

The pressure vessel is composed of an inner shell and an outer coat. The intermediate space is filled with a combination of insulating materials. The insulation from inside towards outside is composed 5 from four to seven 10 mm thick layers of cryogenic protection (in total from 80 to 140 mm) made of nanostructure insulating material (based on aerogel). Every layer is compressed with bands, so that there is no space for air in between. After four or seven layers there is a thermal shrink foil 10 of 0.038 to 0.12 mm thick. This shrink foil has the role of a vapor barrier. The next four to seven layers of insulation are installed. Every layer is compressed with bands. The next thermo shrink foil 10 is installed. Toward the outer coat of the vessel expanded insulation foam (thickness 30 to 50 mm) has to fill out the voids resulting from the deviations between the outer shape and the piping installations. Directly under the outer coat there is 6 to 18 mm fire protection. The introduction of insulation with at least 120 minute fire resistance presents an additional contribution to fire damage risk.

Existing vacuum insulated tanks have an outer shell made of construction steel 1 Omm thick and reinforced with U profiles in order to prevent the collapse due to outer pressure. In the project developed nanostructure insulated vessels have an outer coat of only 1 mm thickness of stainless steel. The intermodal unit CRYOTAINER 34000 LNG/40' is some 10.000 kg lighter than comparable tanks with vacuum insulation. The difference in environmental load in the manufacture is significant it saves 10000 kg of steel and eliminates also the emissions to the environment derived from steel production. In stabile units the difference is equal depending on the size of the vessel.

The stationary tanks are intended to replace the liquefied petrol gas (LPG) that is in production directly connected to the available crude oil production. This product enables direct replacement on the market in municipal areas where there are no conditions established for a pipeline connection.

Embodiments, implementation cases, features and further details of the present invention are explained in the following on the basis of the drawings in which.

Figure 1:
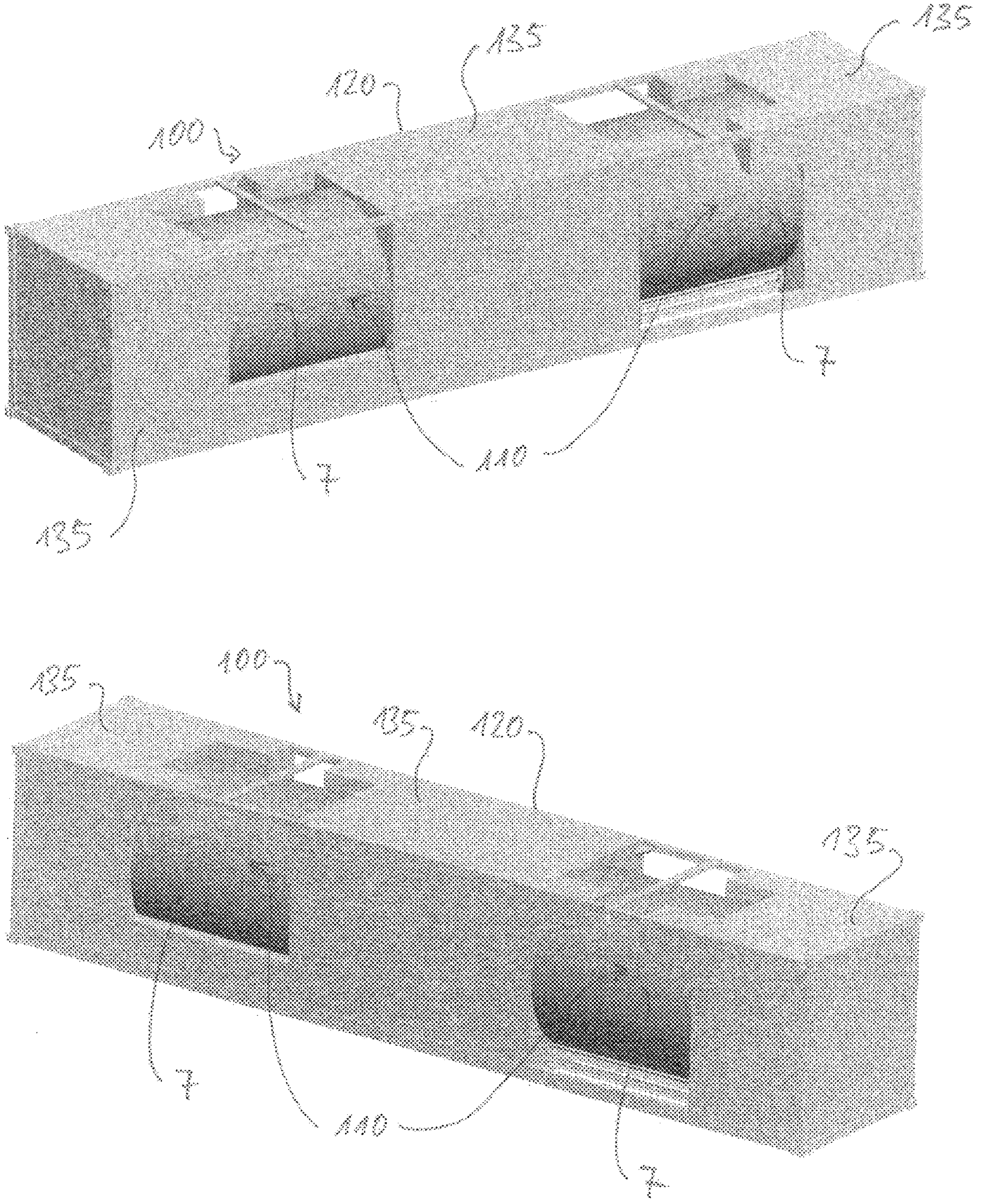
FIG. 1 shows perspective views of a first embodiment of a tank container according to the present invention (Unit CRYOTAINER 34000 LNG/40')
Figure 2:
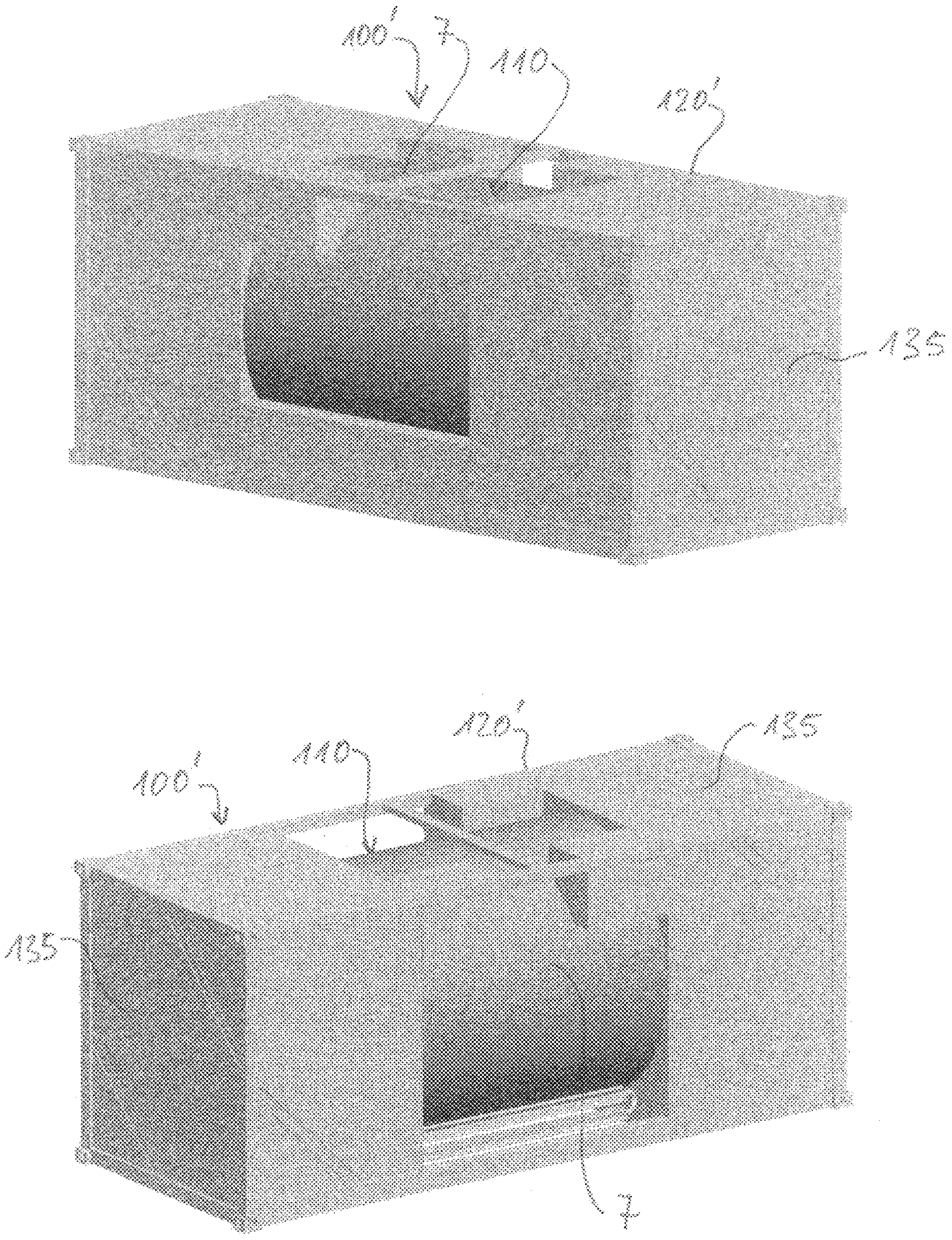
FIG. 2 shows perspective views of a second embodiment of a tank container according to the present invention (Unit CRYOTAINER 16800 LNG/20');\
Figure 3:
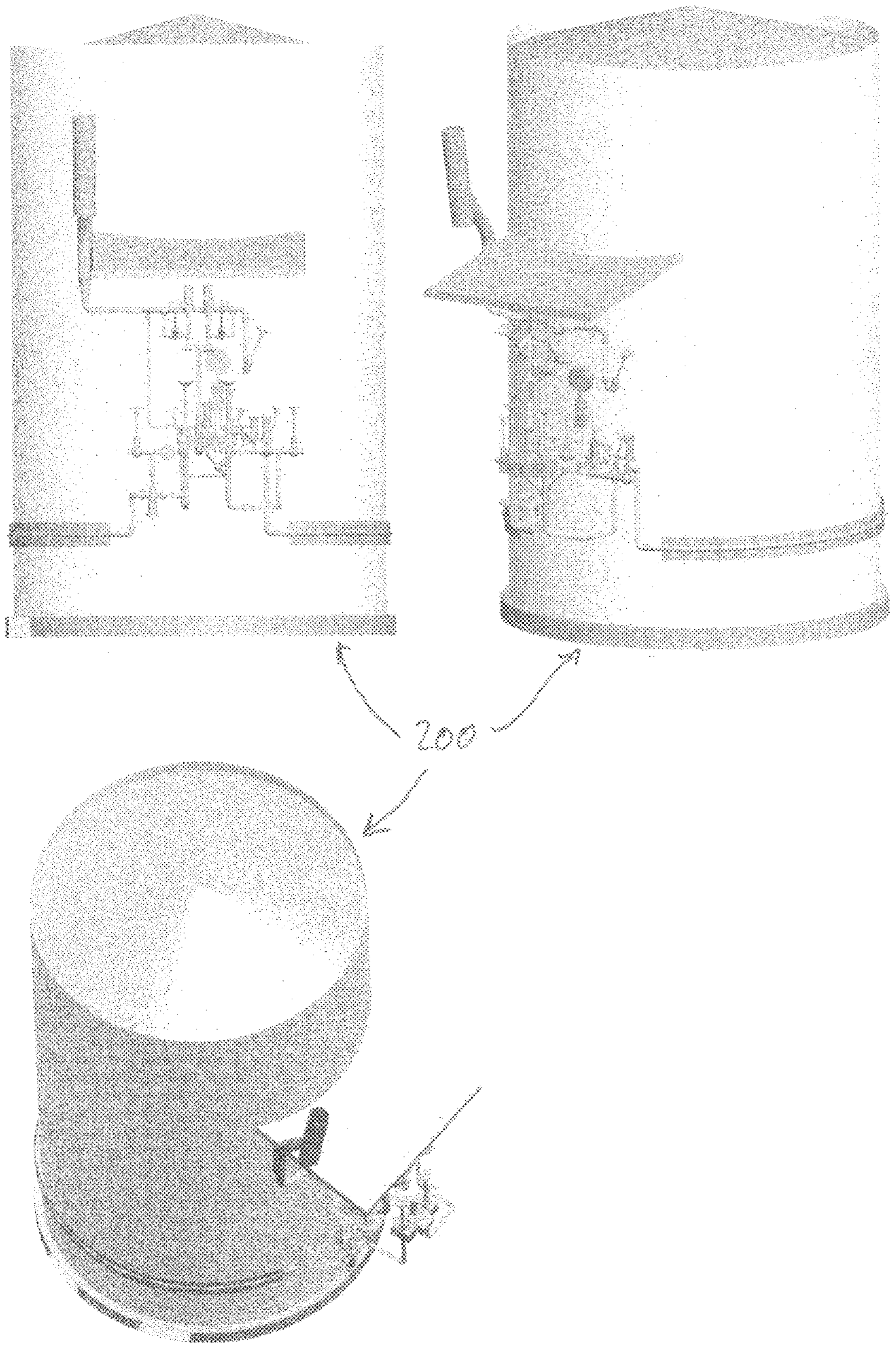
FIG. 3 shows perspective views of an embodiment of a storage container (Vertical stabile unit CARD 8600 LNG)
Figure 5:
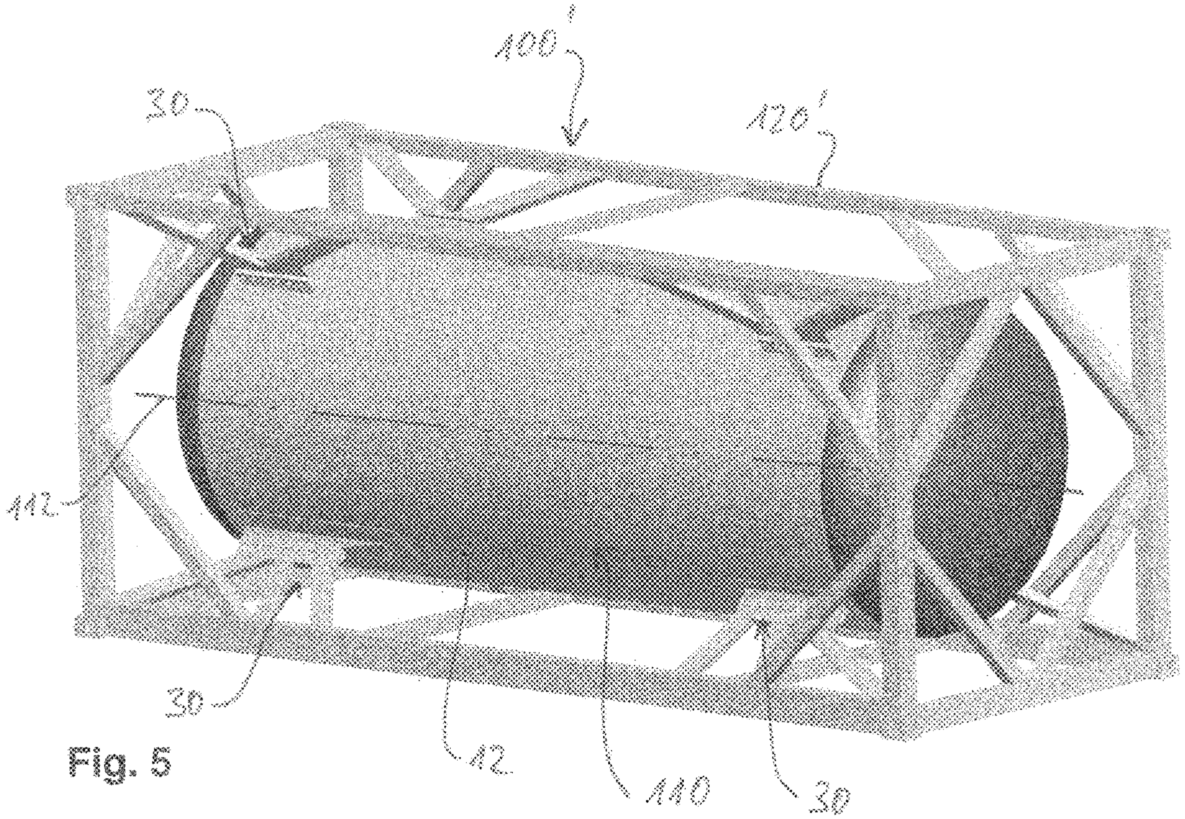
FIG. 5 shows the tank container of FIG. 2 including the arrangements of supports in the frame without the insulation.
Figure 7A:
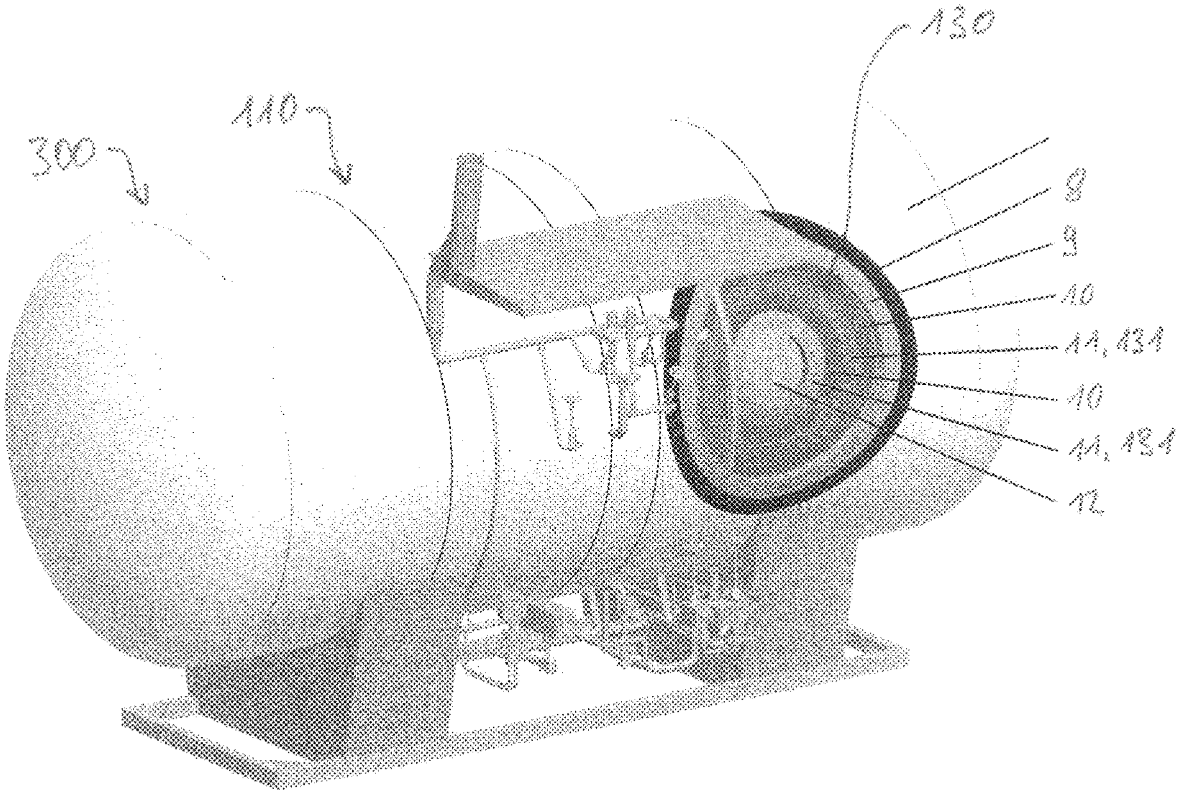
Figure 8:
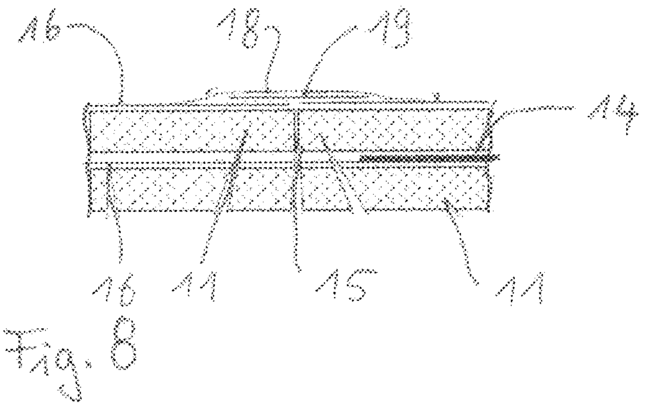

FIG. 6*a* to *d* show details of the support structure of the tank container shown in FIGS. 1, 2 and 5;

FIG. 7*a, b* show in a schematic manner the nanostructure insulation arrangement on the stationary horizontal tank shown in FIG. 3 also realized on the tank container according to the present invention;

FIG. 8 shows a further detail of the insulation arrangement of FIG. 7*a, b;*

Figure 6A:
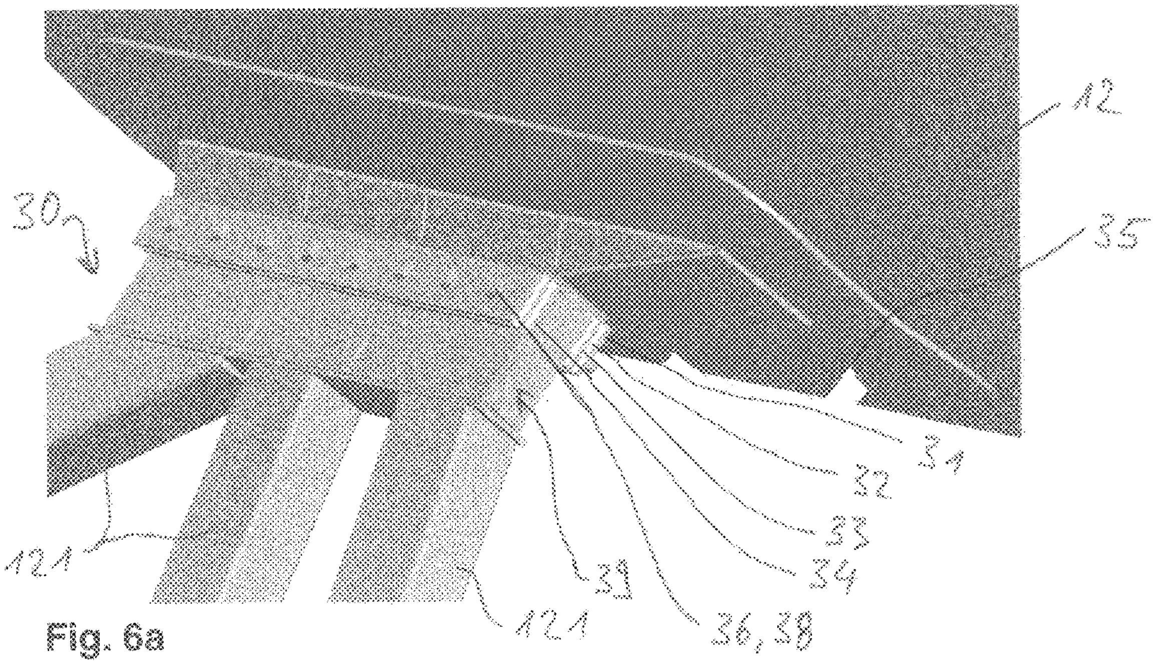
Figure 6B:
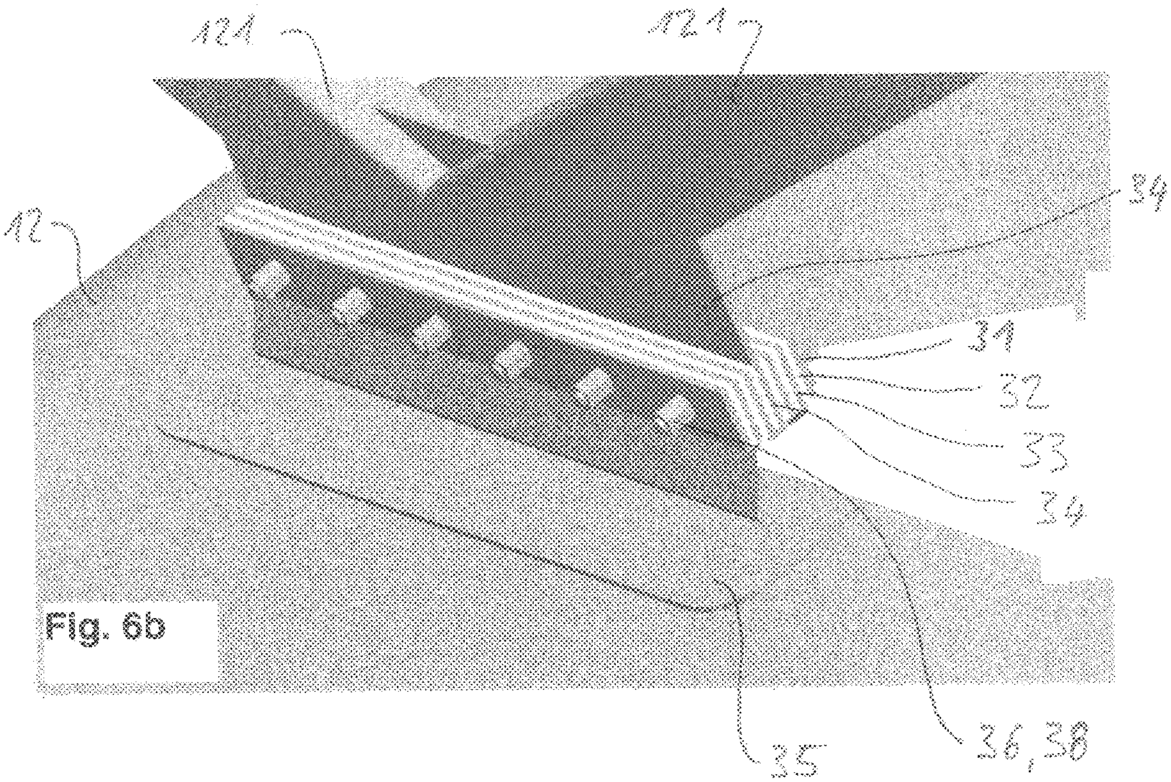
Figure 6C:
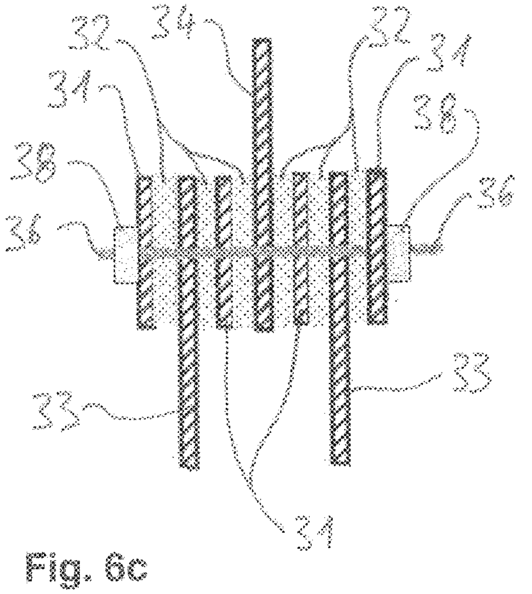
Figure 9:
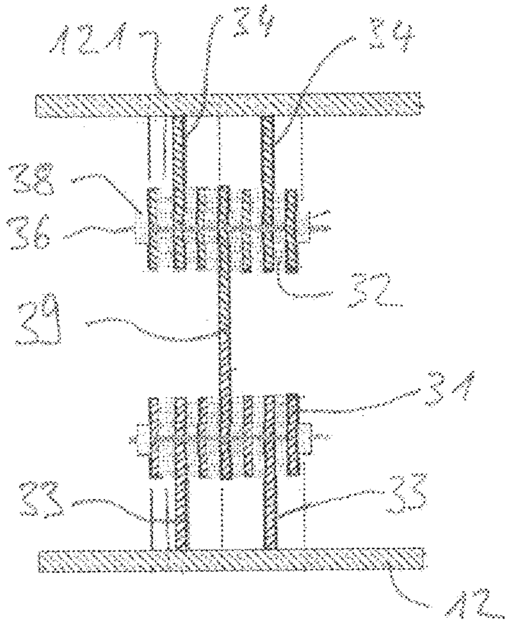
Figure 10:
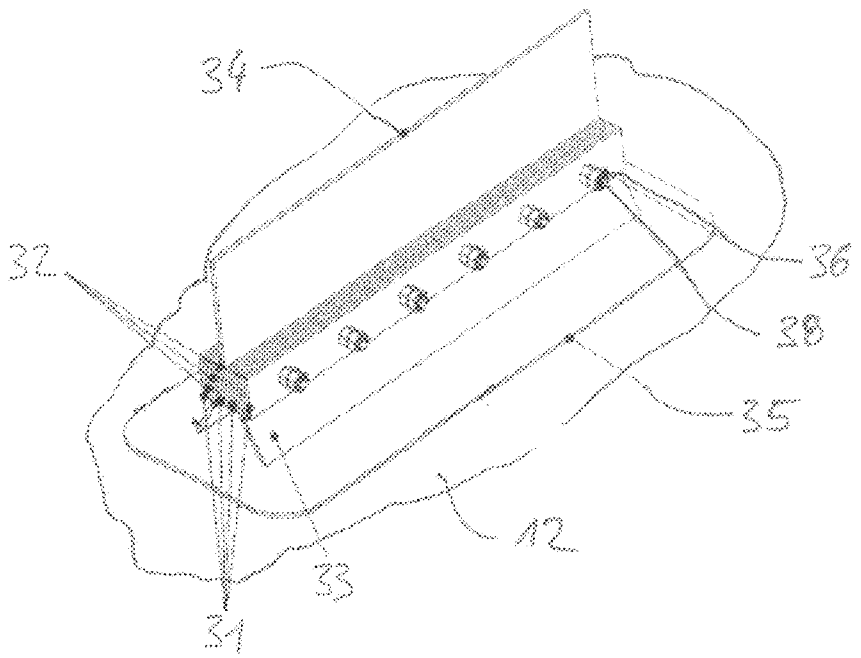
Figure 11:
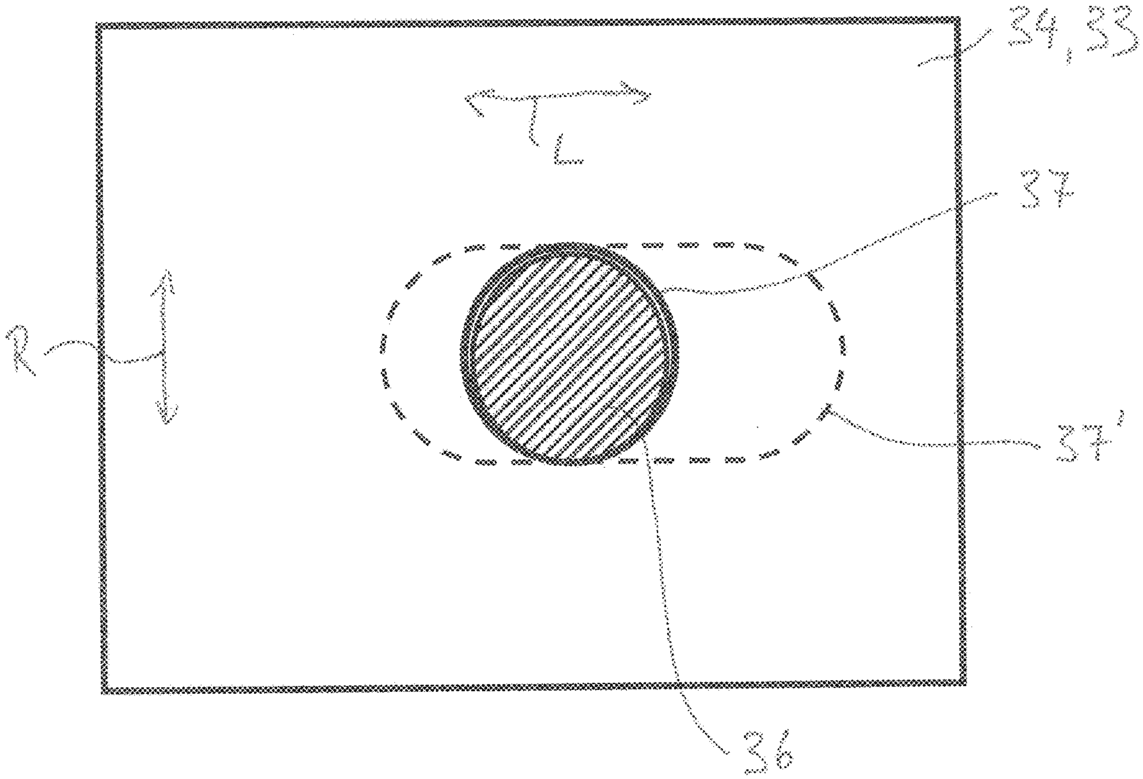

FIG. 9 shows in a schematic manner a further embodiment of a support structure for a tank container according to the present invention;

FIG. 10 shows a perspective view of a support structure according to FIG. 6*c*; and FIG. 11 shows a detail of a support structure.

IMPLEMENTATION CASE 1

»Intermodal« tank container unit 100 CRYOTAINER 34000 LNG/40' (FIG. 1) is intended for the long range transportation of liquefied natural gas and is assembled of two horizontal vessels 110 of 16.800 liter clamped into a standard frame 120 for a 40-foot (~12 m long; in the following text as 40') container.

Figure 7B:
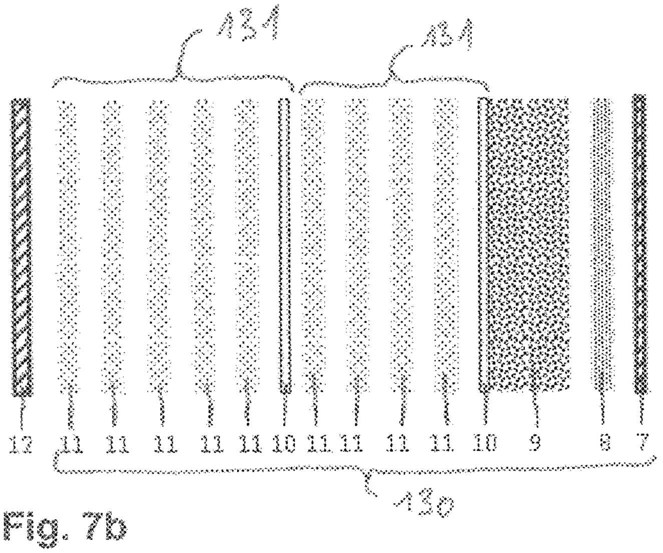

Each pressure vessel 110 is horizontally embedded in the standard ISO 40 ' container frame 120'. The pressure vessel 110 is defined of an internal shell 12 which is covered by an external insulation coating formed by a cover sheet 7. The space between shell 12 and coating 7 is filled with an insulation arrangement 130 comprising a combination of insulating materials. (FIG. 7*a*, FIG. 7*b*). The insulation arrangement 130 from the inside towards the outside consists of at least one (two according to FIG. 7*b*) set 131*s* of several (five with a thickness of 10-mm, as indicated in FIG. 7*b*) nanostructure insulation layers 11 of cryogenic insulation based on an aerogel composition (total 100 mm). In the present case, a composite material which contains homogeneous or heterogeneous aerogel phases with at least one additive incorporated either into the gel matrix (e.g. during synthesis) or added to the gel as a second distinct phase such as fibers, blankets, a fleece or also by a subsequent modification by compounding. The insulation arrangement 130 shown in FIG. 7*a* in connection with the storage vessel 300 is also applicable to the Tank container unit 100 and 100'.

FIGS. 1 and 2 show optional insulation casings 135 which completely surround the saddle structures 121 and tank supports 30 described below.

Each layer 11 is particularly well-compressed by means of tapes 14 (see FIG. 8), that the individual layers 11 of insulation are separated by a thin air space. After each five layers of insulation an internally installed thermo-shrink film 10 in the thickness of 0.05 mm is installed. The thermo shrinkable film 10 acts as vapor barrier. Then there are five additional layers 11 of insulation placed to insulate cryogenic temperature range. Each layer is compressed by means of strong bands 14. After a total of ten layers 11 again the same thermo-shrinkable film 10 is placed. Toward the outer circumference of the vessel coat the insulation is followed by a filling layer 9 based on expanded foam for filling the gaps, which are the result of variations in the circumference of the container 20 and built-in installations. Under the outer coat 7 is a 10 mm fire protection layer 8.

The outer coat layer 7 is formed from thin metal sheets which form a completely sealed enclosure of the insulation arrangement 130 which serves as an additionally vapor barrier. For this purpose the sheets of the coat layer 7 are welded to each other and/ or to a suitable substructure connected to the frame (120) or to the vessel 110. The fire protection layer 8 underneath serves as thermal shield during welding which protects the components of the insulation arrangement 130 underneath the fire protection layer 8.

The fire protection layer 8 may also be based on an aerogel composition. Also, the filling layer 9 may also be based on an aerogel composition, e.g. finely divided aerogel pieces or crumbs of aerogel with typical diameters below 1 em for granules and 1 mm for powders which may be provided in 30 suitable bags, filled blankets or flexible hoses.

FIG. 8 shows a further detail of the insulation arrangement 130. Each insulation layer 11 is provided with a thermal radiation shield layer 16 formed as metallic sheet (e.g. aluminum) which is attached to the insulation layer 11. Gaps 15 between adjoining insulation layers 11 (and radiation shield layers 16) are sealed with a sealing tape 18 with self sticking layer 19. Each gap 15 is also bridged in a radial direction to vessel shell 7 a preceding and/or following insulation layer 11 for improved insulation. The insulation layers 11 are fixed and optionally compressed by surrounding tightening bands or tapes 14.

The inner shell 12 of the vessel 110 is made of stainless steel. The pressure vessel 110 is equipped with installations for the loading and unloading, pressure indication, level and of the pressure control. The pressure vessel is built with two safety relief valves, which prevent excessive increase in pressure in the tank due to gasification of liquefied gas.

In the frame 120 of 40' tank container unit two pressure vessels 110 of the same size are arranged horizontally along a tank vessel axis 121. Each of these vessels 110 can be used due to installation that is functioning independently.

Large temperature difference causes some material elongation or in this case shrinkage. Temperature elongations according to the invention of the tank supports formed as clamping devices 30 (see FIGS. 5, 6*a* to *d*) are neutralized by using a specially mounted container. The mounting into in a 15 container frame is designed so that it allows the movement of containers vessel due to thermal shrinkage or expansion. The vessel 110 is mounted in a fixed frame 110 of the tank container 100. The vessel support legs 33 have openings 37 (e.g. formed as elongated holes) that allow the movement—shrinkage of the vessel due to temperature or strain within the frame. Joint elements formed as screws 36 are tightened with a force that does not cause excessive friction. Further suitable joint elements are bolt elements.

A specificity of such a support 30 is the low thermal conductivity, which is achieved by a sandwich structure comprising a (first) steel plate element 34 which is welded to a saddle structure 121 of the frame 120. Plate element 34 is sandwiched between two (second) steel plate elements 33 welded to the tank vessel shell 12 via a doubler plate 35

(FIGS. 6*a* and 6*c*). Between the first plate element 34 and the second plate elements 33 are insulation plate elements 32 arranged formed from suitable material having a low thermal conductivity and a suitable brittle resistance at very low temperatures (e.g. PTFE (Teflon) or reinforced plastic sheet material) which reduce the thermal conductivity between the vessel 110 and the frame 110. Carbon steel (28 W/mK) conductivity is much higher than a typical thermal conductivity of PTFE (0.23 W/mK) panels.

The whole sandwich structure of the clamping device 30 is compressed by the joint elements 36, which penetrate corresponding openings 37 of the plate elements 32, 33, 34.

As shown in FIG. 11 the cross sectional dimension of the opening 37 exceeds in at least one direction the cross sectional dimension of the penetrating joint element 36 to reduce the contact 9 area between the joint element 37 and the inner face of the opening 37. For this purpose the opening 37 can be formed as an elongated hole (dashed outline 37') or with a circular diameter exceeding a smaller diameter of the joint element 36. The openings 37; 37' allow for displacement movements in a longitudinal direction Land in a radial direction R.

In the present case the compressing force is exceeded by the head elements 38 of the joint element 36 formed configured as bolts and the nuts tightened on the thread of the bolt acting as a tie rod. Details of the reduction of thermal bridge is shown in FIGS. 6*a* and 6*b*, with the structure containing PTFE insulation panels (formed as insulation plate elements 34) and panels (acting as stabilizing plate elements 31) made of metal (e.g. carbon steel). The insulation plate elements 34 and stabilizing plate elements 31 are optionally provided to improve the insulation capacity of the clamping device 30. Typically, such a pair of an insulation plate element 32 and a stabilizing plate element 31 is arranged between the first 34 and the second plate element 33 or between at least one of the of the head elements 38 and the first 34 and/or the second plate element 33. (see FIG. 6*b*)

Figure 6D:
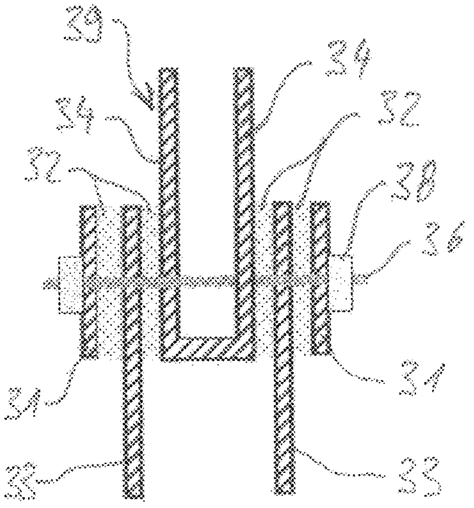

In the arrangement shown in FIGS. 6*a* and 6*d*, the first plate elements 34 are part of box shaped saddle piece 39 connected to the saddle structure 121 which is sandwiched between insulation plate elements 34 and the second plate elements 33 connected to the vessel 110.

The plate elements 31, 32, 33 and 34 extend in a longitudinal direction, parallel to a tank vessel axis 112. Depending of the cross sectional design of the openings 37 and the corresponding joint elements 36 a controlled sliding movement between the first plate elements 34 and the second plate elements 33 is possible at least at the supports 30 at one end of the vessel which may occur due to thermal expansion or contraction. As the plate elements 31, 32, 33 and 34 also extend in a radial direction to the vessel axis 112 they also allow for a radial displacement of the first plate element 34 relative to the second plate element 33.

FIG. 9 shows an embodiment in which the thermal insulation between the frame 120 and the vessel 25 is further improved. A connecting plate 39 is sandwiched between insulation plate elements 34 and first plate elements 34 on the vessel side and second plate elements 33 on the frame side. Optional pairs of insulation plate elements 32 and stabilizing plate 31 elements are also provided to improve the insulation capacity of such a support. The connecting plate 39 is fabricated from steel or a different suitable material which meets the structural requirements necessary to transfer all operational (dynamic and static) loads between the vessel and the frame.

IMPLEMENTATION CASE 2

Intermodal unit CRYOTAINER 16800 LNG/20' (FIGS. 2 and 5) is intended for local transport of liquefied natural gas and is composed of a horizontal vessel 110 of 16.800 liter volume clamped into a standard 20-foot (some 6 m; vas 20' in the following text) frame 120'.

Pressure vessel 110 is horizontally embedded in the standard ISO 40 ' container frame 120'. All further features and embodiments of the insulation arrangement 130, supports 30 and the saddle structure 121 described above in connection with implementation case 1 also apply to the tank container 100' with a single vessel 110 according to implementation case 2 (FIGS. 2 and 5).

IMPLEMENTATION CASE 3

The vertical stationary pressure vessel 200 CARD 8600 LNG (FIG. 3) is intended for storage and distribution of liquefied natural gas. The volume of the vessel is 8.600 liter (the family extends from 8.600 to 15.000 liter). This vessel presents a cost effective alternative to local supply of customers on low population density areas, where a pipeline solution would prove not feasible due to high capital involvement. The use of liquefied natural gas in supply of medium and small consumers can present an option also for the supply of vehicles in traffic where it is one of the cleanest and environmentally most favorable solutions. All further features and embodiments of the insulation 130 described above in connection with implementation cases 1 and 2 also apply to the vertical stationary vessel 200 according to implementation case 3.

IMPLEMENTATION CASE 4

Figure 4:
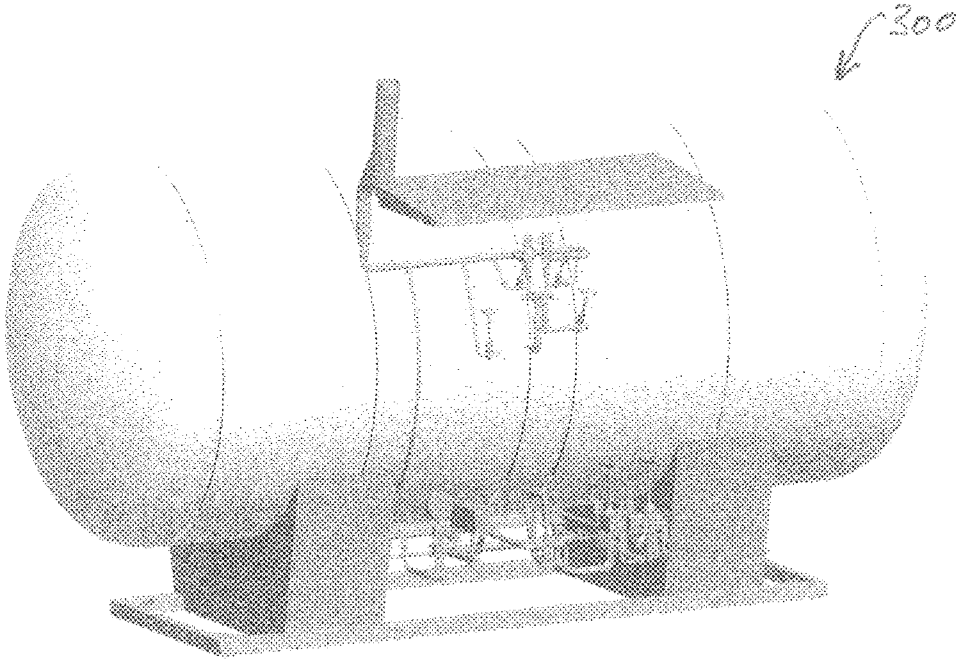
FIG. 4 shows a further embodiment of a storage container (Horizontal stationary unit CARD 15600 LNG)

The horizontal stationary pressure vessel 300 CARD 15600 LNG (FIG. 4) is intended for distribution of liquefied natural gas. The volume of the vessel is 15.600 liter (the family of vessels is in the range from 8.600 to 27.000 liter). This vessel presents a cost effective alternative to local supply of customers on low population density areas, where a pipeline solution would prove not feasible due to high capital involvement. The use of liquefied natural gas in supply of medium and groups of small consumers can present an option also for the supply of vehicles in traffic where it is one of the cleanest and environmentally most favorable solutions.

The vessel is supported by a foundation insulated with foam glass. All further features and embodiments of the insulation 130 described above in connection with implementation cases 1 and 2 also apply to the horizontal stationary vessel 300 according to implementation case 4.

The following features are realized at least partly in the implementation cases described above and specifically in the tank container 100, 1 00' according to the present invention.

1. The cryogenic equipment or device 100, 100' for transport and storage of liquefied gas is identified with the basic means of insulation the cryogenic insulation is used, predominantly nanostructure insulation based on aerogel and that there is no need for vacuum or below atmospheric pressure.
2. The cryogenic device 100, 100' from point 1 is identified by the insulation between the inner shell 12 and outer coat 7 is composed from the following components:
   a. The layer close to the inner vessel shell 7 includes from 7 to 14 layers 11 of cryogenic insulation in a total thickness of 80-140 mm;
   b. Optionally a foil 16 enveloping or separating the layers 11 of cryogenic insulation one or more thermo shrink foils 10 are placed 0.038-0.12 mm thick or some other element that serves as vapor protection and as a separation layer during eventual possible dismantling of the cryogenic insulation;

c. Optionally layers of insulation foam 9, preferably expanded foam in the thickness of 30-50 mm, that will fill the void to the fire protection (8);

d. Optionally a layer 8 of fire protection follows 6-18 mm thick, preferably nanostructure aerogel, which is fixed to the outer coat 7.

3. The cryogenic device 100, 100' in point 1-2 is identified with the with evaporation rates of less than 0.36% of full load per day.

4. The cryogenic device 100, 100' in point 1-3 is identified with the property of fire resistance preventing the temperature to rise, is at least 60 minutes preferably 120 minutes 5. The cryogenic device 100, 100' in point 1-4 is identified with the volumes of containerized tanks are 16.800 liter and 32.600 liter.

6. The cryogenic device 100, 100' in point 1-4 is identified with the volumes of storage tanks 30 110 are 8.600 liter in 27.000 liter 7. The cryogenic device 100, 100' in point 1-5 is identified with the clamping 30 in the ISO container is executed so that it enables free movement of the shrinking.

8. The cryogenic device 100, 100' in point 7, is identified with the clamping on one side front or back of the vessel 110 to be fixed, on the other end of the vessel 110 is not fixed but the screws 36 have space to allow deviations by means of elongated bores 37 and with screws 36 tightened with low force that prevents most friction.

9. The cryogenic device in point 8, is identified with specific clamping 30 where for maximal effect the clam is insulated with PTFE insulation plates 32 and carbon steel plates 31.

The method of insulation of cryogenic devices is not based on conventional vacuum insulation but on nanostructure insulation 130.

10. The procedures to minimize the effect of the fixing of the vessel to the outer coat 7 is designed on the reduction of the heat conductivity of the support 30, -prolonged heat conduction path, -smaller contact surfaces, -corresponding mechanical resistance and rigidity that is obtained in the following way:

a. More blades 31 of thin sheet on the cold side;

b. More blades 31 of thin sheet on the warm side;

c. Separation—the space between the blades is separated with a layer 32 of fitting PTFE;

d. The screw joint 38 is protected against loosening, since the sole function is prevention of separation or dislocation of the joint.

The invention claimed is:

1. An insulation arrangement configured to cover a vessel containing a liquified gas, the insulation arrangement comprising:

an insulation layer set comprising:

a first insulation layer including an aerogel composition;

a second insulation layer including an aerogel composition, the second insulation layer adjacent to the first insulation layer;

a band disposed between confronting faces of the first insulation layer and the second insulation layer, the band defining a space between the first insulation layer and the second insulation layer; and a vapor barrier, wherein the insulation arrangement reduces heat transfer between the ambient environment and the liquified gas.

2. The insulation arrangement of claim 1, wherein the aerogel composition includes fiber.

3. The insulation arrangement of claim 1, wherein the insulation layer set includes more than two layers of aerogel insulation material.

4. The insulation arrangement of claim 3, wherein the band compresses at least one of the first insulation layer and the second insulation layer.

5. The insulation arrangement of claim 1, wherein the insulation arrangement includes at least two insulation layer sets comprising aerogel and wherein the vapor barrier is disposed between the at least two insulation layer sets.

6. The insulation arrangement of claim 1, wherein the insulation layer set includes at least one radiation shield layer between the first insulation layer and the second insulation layer.

7. The insulation arrangement of claim 6, wherein the radiation shield layer includes a metallic sheet.

8. The insulation arrangement of claim 1, wherein the vapor barrier includes a thermo-shrinkable film.

9. The insulation arrangement of claim 1, further comprising at least one outer cover sheet enclosing the insulation arrangement.

10. A tank container comprising a vessel covered by an insulation arrangement according to claim 1.

11. An insulated clamping device configured to connect a vessel to a framework, the vessel including the insulation arrangement of claim 1, the insulating clamping device comprising a sandwich structure including at least one first plate element, at least one second plate element, and an insulating plate element arranged between the first and the second plate element, wherein the first, second and insulating plate elements each have at least one opening, and wherein the first, second and insulating plate elements are interconnected by a joint element traversing corresponding openings of the first, second and insulating plate elements.

12. The insulated clamping device of claim 11, wherein the thermally insulating plate reduces a thermal bridging effect between the vessel and the framework.

13. The insulating clamping device of claim 11, wherein the sandwich structure includes at least one stabilizing plate element arranged between the first and second plate element.

14. The insulating clamping device of claim 11, wherein the insulating plate element includes a fiber reinforced plastic material comprising PTFE.

15. A connection system comprising a vessel, the vessel including the insulation arrangement of claim 1, a framework, and an insulating clamping device connecting the vessel and the framework, the insulating clamping device comprising a sandwich structure including at least one first plate element connected to the framework, at least one second plate element connected to the vessel, and an insulating plate element arranged between the first and the second plate element, wherein the first, second and insulating plate elements each have at least one opening, and wherein the first, second and insulating plate elements are interconnected by a joint element traversing corresponding openings of the first, second and insulating plate elements.

16. The connection system of claim 15, wherein the sandwich structure includes at least one stabilizing plate element arranged between the first and second plate element.

17. The connection system of claim 15, wherein the insulating plate element includes a fiber reinforced plastic material comprising PTFE.

18. The connection system of claim 15, wherein the vessel is covered by an insulation arrangement, the insulation arrangement including an aerogel composition.

19. The connection system of claim 18, wherein the insulation arrangement further includes a vapor barrier.

20. The connection system of claim 18, wherein the aerogel composition includes a fiber additive.

* * * * *